(12) United States Patent
Firey

(10) Patent No.: US 8,382,958 B2
(45) Date of Patent: Feb. 26, 2013

(54) CYCLIC BATCH COAL DEVOLATILIZATION APPARATUS

(76) Inventor: Joseph Carl Firey, Seattle, WA (US)

(*) Notice: Subject to any disclaimer, the term of this patent is extended or adjusted under 35 U.S.C. 154(b) by 712 days.

(21) Appl. No.: 12/590,333

(22) Filed: Nov. 6, 2009

(65) Prior Publication Data

US 2011/0108404 A1 May 12, 2011

(51) Int. Cl.
*C10B 1/04* (2006.01)
*C10B 27/00* (2006.01)
*C10B 51/00* (2006.01)

(52) U.S. Cl. .......... 202/113; 202/227; 202/258; 201/24; 201/35; 201/36

(58) Field of Classification Search .................. 202/106, 202/113, 258, 227; 201/24, 35, 36
See application file for complete search history.

(56) References Cited

U.S. PATENT DOCUMENTS

| | | | | |
|---|---|---|---|---|
| 3,986,348 A * | 10/1976 | Switzer, Jr. | ...................... | 60/781 |
| 5,187,141 A * | 2/1993 | Jha et al. | ...................... | 502/432 |
| 7,334,390 B2 * | 2/2008 | Firey | ........................... | 60/39.12 |
| 7,998,236 B2 * | 8/2011 | Calderon et al. | .................. | 71/54 |
| 8,187,350 B2 * | 5/2012 | Firey | ........................... | 48/197 R |

* cited by examiner

*Primary Examiner* — Nina Bhat

(57) ABSTRACT

Apparatus and a process are described for compressing superheated steam into porous coal batches in chambers, and, after a time interval, expanding this steam out of the chambers, and repeating this steam cycle of compression followed by expansion. Thusly heated by the steam, volatile matter separates from the solid coke portion of the coal and separate volatile matter and coke products can be produced from coal or biomass fuels. These volatile matter liquids and tars can be used as fuel components in slurry fuels, for internal combustion engines used in our surface transportation industries. These solid coke products can be used as boiler fuel in steam electric plants. In this way our large domestic reserves of coal can be used as a fuel source, not only for electric power generation, but also for our surface transportation needs.

6 Claims, 7 Drawing Sheets

CYCLIC BATCH COAL DEVOLATILIZATION APPARATUS

CROSS REFERENCE TO RELATED APPLICATIONS

The invention described herein creates several fuel products, from coal and biomass, which are suitable for use in internal combustion engines equipped with fuel systems as described in the following U.S. Patents and Patent Applications:
(1) U.S. Pat. No. 7,281,500, Supplementary Slurry Fuel Atomizer and Supply System, Firey, 2007.
(2) U.S. Pat. No. 7,418,927, Common Rail Supplementary Atomizer for Piston Engines, Firey, 2008.
(3) U.S. Patent Application, Rotary Residual Fuel Slurrifier, Ser. No. 11/796,714, filed 30 Apr. 2007 now U.S. Pat. No. 7,677,791, Joseph C. Firey, inventor.
(4) U.S. Patent Application, Modified Common Rail Fuel Injection System, Ser. No. 12/011,569, filed 29 Jan. 2008 now abandoned, Joseph C. Firey, inventor.
(5) U.S. Patent Application, Coke Burning Engine, Ser. No. 12/316,571, filed 15 Dec. 2008 pending, Joseph C. Firey, inventor.
(6) U.S. Patent Application Rotary Tar Slurrifier Ser. No. 12/583,448, filed 21 Aug. 2009 now U.S. Pat. No. 8,152,359, Joseph C. Firey, inventor.

The refuel mechanisms described in the following U.S. Patents can also be used for similar fuel transfer operations in the invention described herein:
(7) U.S. Pat. No. 4,653,436, Untimed Refuel and Ash Removal for Char Burning Engines, Firey, 1987.
(8) U.S. Pat. No. 5,485,812, Multiple Sources Refuel Mechanism, Firey, 1996.

BACKGROUND OF THE INVENTION

This invention is in the field of alternative fuels to power our critical transportation industries. The steam engine, using coal as the energy source, made the industrial revolution possible, and powered the early transportation systems. The more flexible internal combustion engine, using petroleum fuels, has since displaced coal and steam engines from transportation systems, both commercial and military. But petroleum reserves are limited, and petroleum energy is expensive, whereas coal reserves are very large, and coal energy is low cost. In energy units, worldwide coal reserves are about thirtyfold greater than worldwide petroleum reserves. Energy prices vary, but coal energy usually costs about one-tenth the cost of petroleum energy. As a result, many efforts are underway to derive fuels from coal which can be used in internal combustion engines.

Some examples of these efforts to adapt coal for use in internal combustion engines, in transportation applications, are as follows:
(1) Railroad locomotive diesel engines were operated experimentally on pulverized coal suspended in water slurries. Engine operation was reasonably satisfactory. However, excessive fuel injection nozzle wear resulted, perhaps from solid coal particle impact on nozzle surfaces, even when sapphire nozzle inserts were used. Combustion benefits expected from smaller coal particle size were rather poorly realized. This has been attributed to coal particles reagglomerating after fuel injection into the engine combustion chamber. The results of these diesel engine experiments are summarized in the following publication:

*Coal Fueled Diesel Engines,* 1993, edited by J. Caton and H. Webb, published by ASME, Publ. No. ICE, Vol 19.
(2) The Fischer-Tropsch process, for transforming coal into liquid hydrocarbon fuels, was developed, out of necessity, by Germany during World War II. Currently, South Africa and China are reported to be developing improved forms of this Fischer Tropsch process, in order to increase domestic supplies of transportation hydrocarbon fuels. Limited available information indicates that the overall energy efficiency of these coal to liquids processes are rather low, a large coal quantity yielding a small hydrocarbon fuel output.
(3) Selected coals, and biomass, have long been transformed into solid coke, by devolatilization in coke ovens, for use in the iron and steel industry. Devolatilization is a complex physical and chemical process, which separates solid coke from several volatile matter products, such as liquid carbonaceous fuels and tars. These volatile matter products are recovered in byproduct coke ovens, but are not currently used as fuels for internal combustion engines.

In the United States, the need for a reliable, long-term, domestic, source of transportation fuel, for commercial and military uses, has long been recognized. In America, domestic petroleum reserves are very limited, whereas domestic coal reserves are very large. Coal and biomass derived fuels, for transportation uses, could substantially improve our national defense and economic capabilities.

SUMMARY OF THE INVENTION

Apparatus is described for placing each coal batch separately in a pressure vessel enclosure reactor chamber. Repeated cycles of compression by superheated steam, followed by release of steam and volatile matter from the pressure vessel, are used to remove volatile matter from each batch of coal. When thusly heated by superheated steam, coal, and other carbonaceous fuels such as biomass, undergo a complex devolatilization process involving evaporation of some components, liquefaction of other components, thermal cracking of various components into both larger and smaller molecules, and chemical interactions between these several products. The original carbonaceous coal and biomass are partially transformed into gas fuel products, liquid fuel products, tar fuel products, and solid fuel products. During the steam release portion of each steam cycle, expansion of the gas portions forces much of this gas, together with liquid and tar portions, out of the solid coke products, thus separating these volatile matter portions from the solid coke portions. During steam release the steam, together with the separated volatile matter, leaves the reactor chamber and the solid coke remains within the reactor chamber. Separation of the separated volatile matter into a gas fuel, a liquid fuel and a tar fuel, can be carried out in a tar centrifuge separator followed by a steam condenser and separator. Alternatively, this same volatile matter separation can be carried out in a barometric condenser followed by a flotation separator tank.

The liquid volatile matter fuel, and tar volatile matter fuel, are suitable for use, as slurries, in surface transportation diesel engines, equipped with modified fuel injection systems. The gas volatile matter fuel, and devolatilized coke fuel, can replace coal for use in steam electric power plants.

This invention can be used to efficiently supply economical fuels for internal combustion engines, used in commercial and military transportation applications, from our large reserves of coal, and also from non food farm harvest biomass.

BRIEF DESCRIPTION OF THE DRAWINGS

A schematic diagram of a coal and biomass devolatilization apparatus of this invention is shown in FIG. 1, including a steam boiler (17), several devolatilization reactor chambers (1, 2, 3, 4, 5, 6, 7), a tar centrifuge separator (29), and a surface condenser (22).

An example tar centrifuge separator is shown schematically in cross section in FIG. 2.

Figure 3:
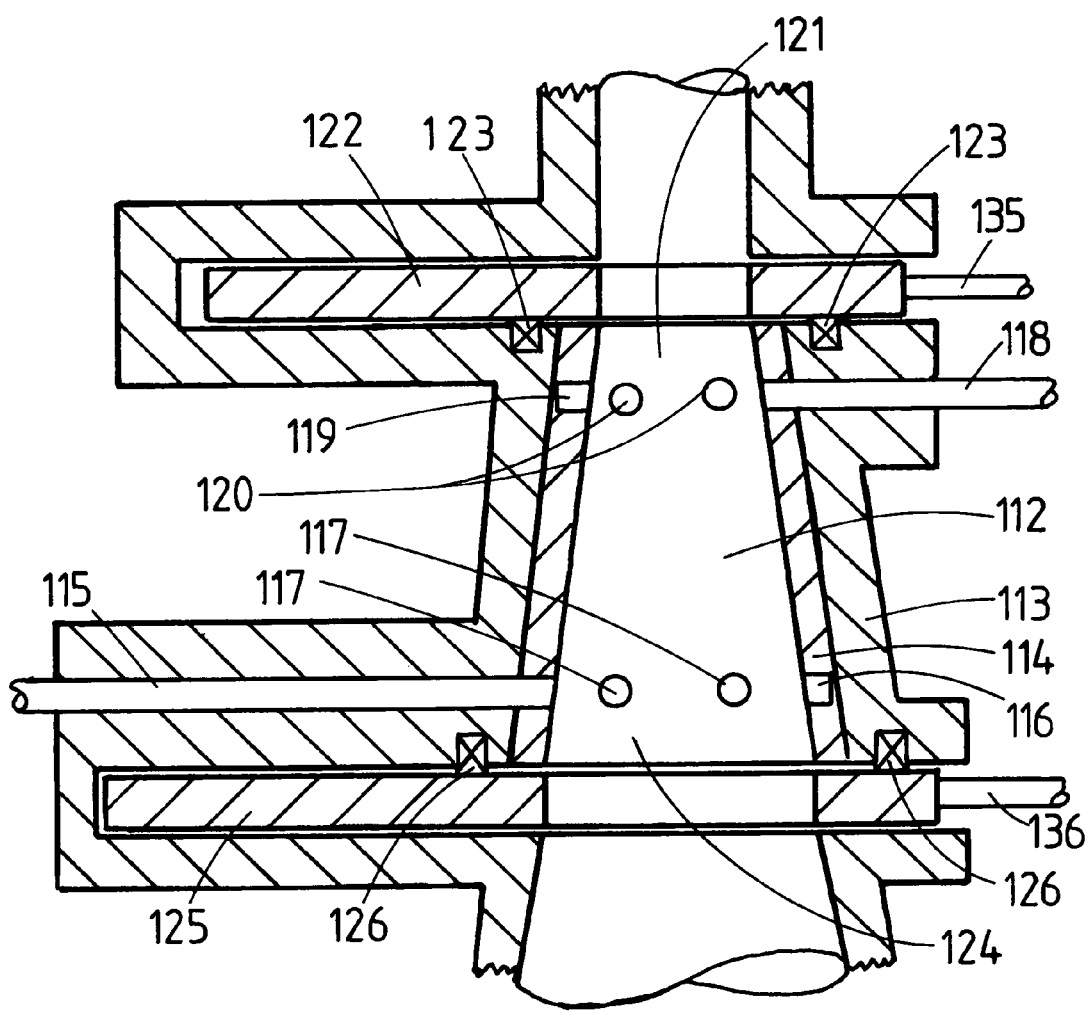

An example devolatilization reactor chamber is shown schematically in cross section in FIG. 3.

Figure 4:
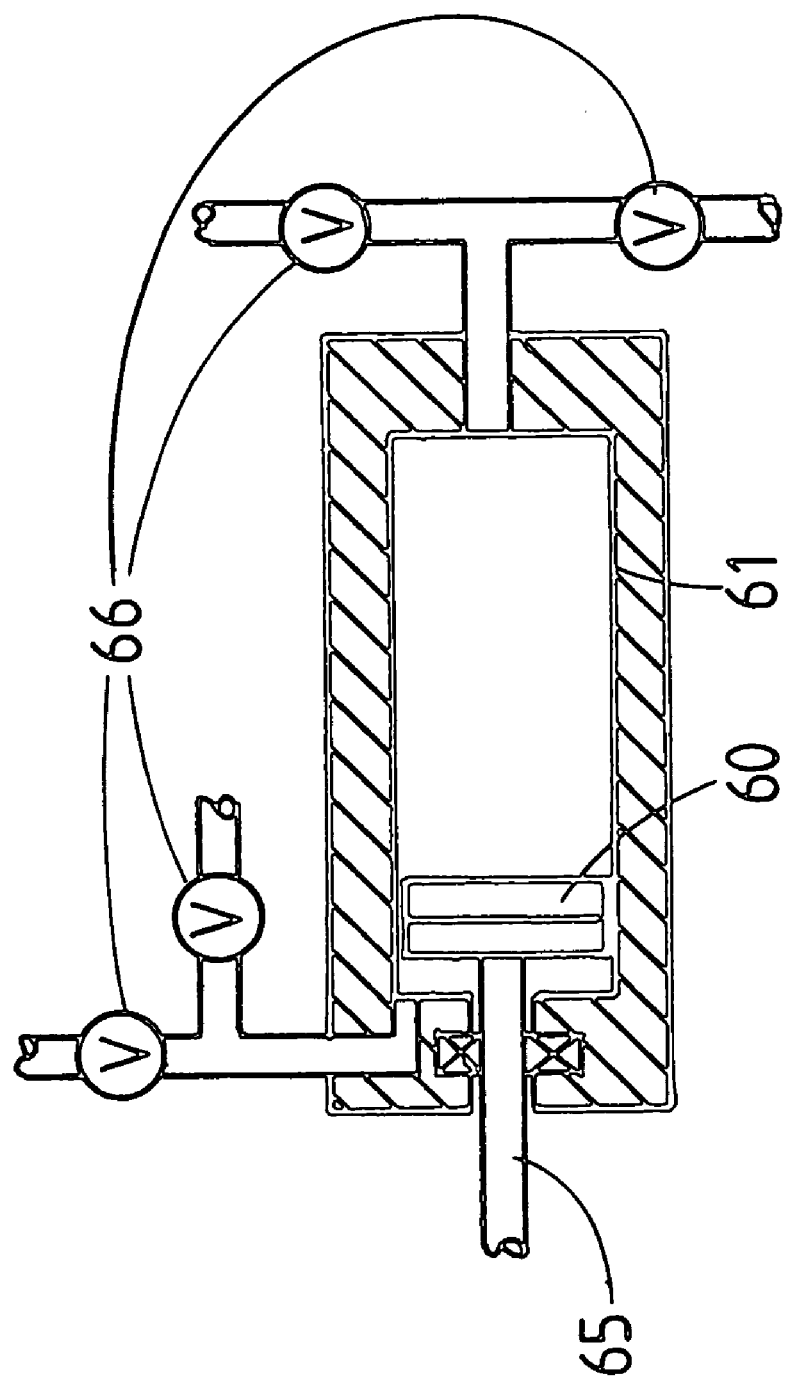

An example piston and cylinder driver mechanism is shown in cross section in FIG. 4.

Figure 5:
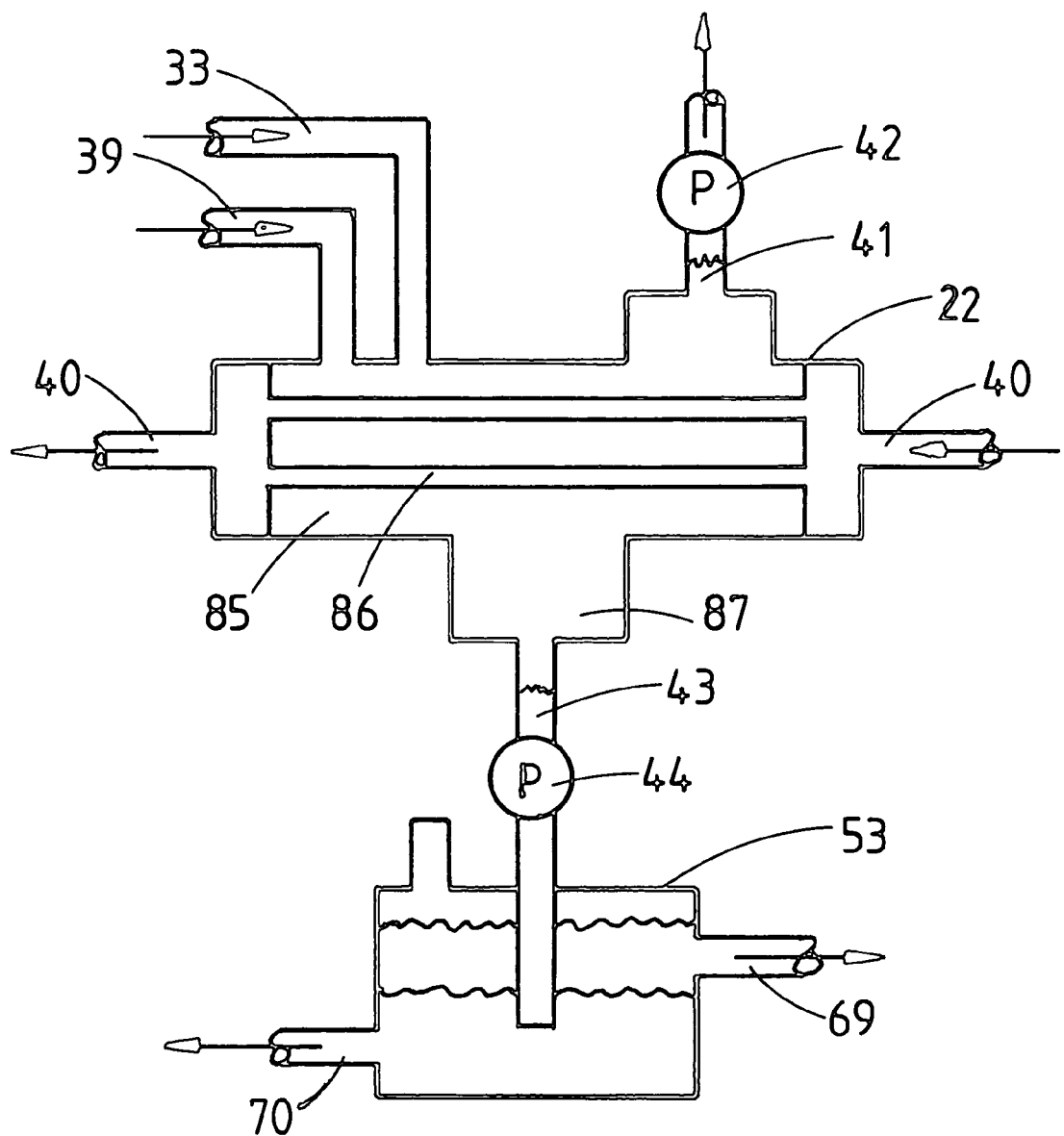

One type of surface condenser separator is shown schematically in cross section in FIG. 5.

Figure 6:
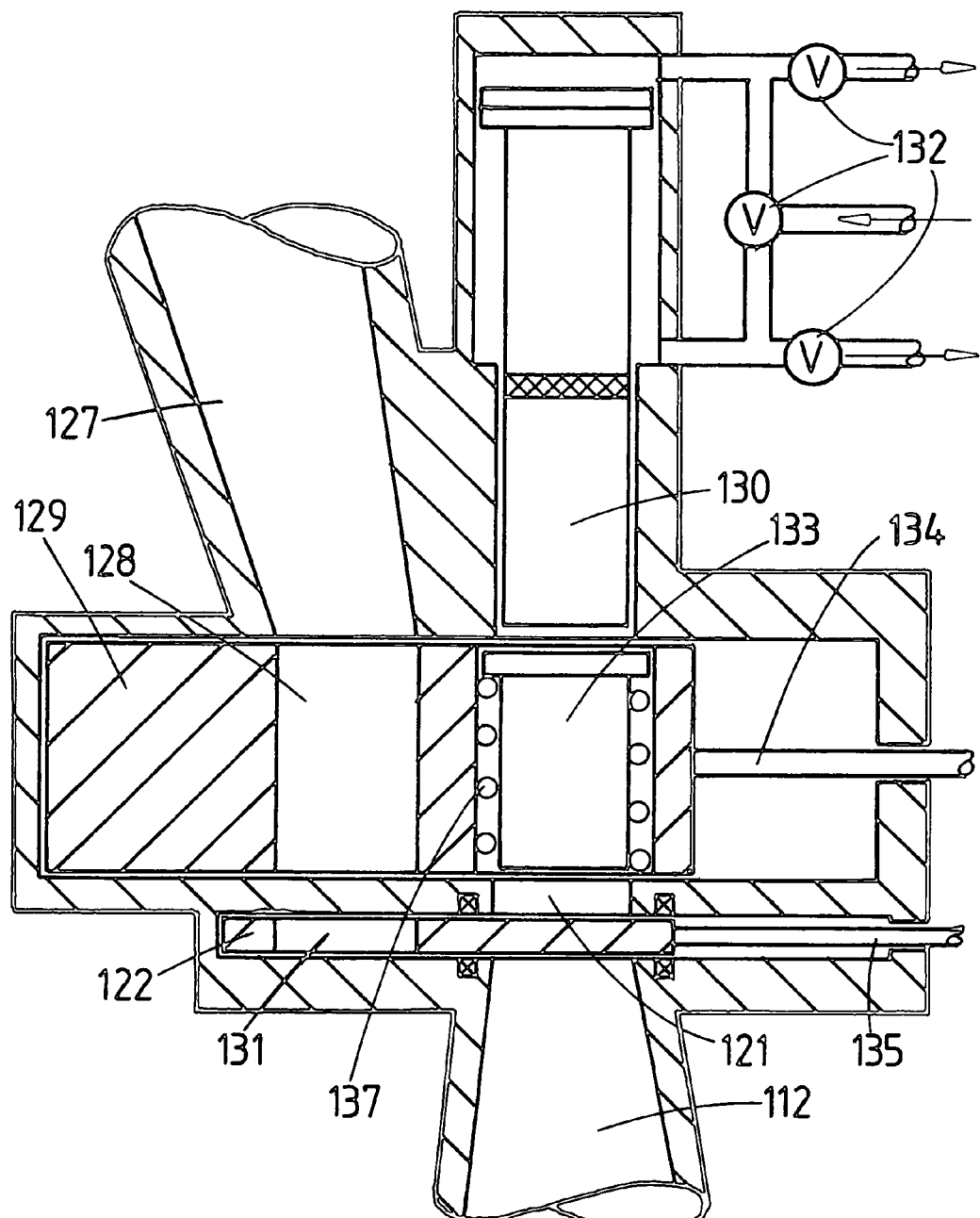

An example coal refill mechanism plus coke removal mechanism for refilling reactor chambers with coal and for removing devolatilized coke from reactor chambers is shown schematically in cross section in FIG. 6.

Figure 7:
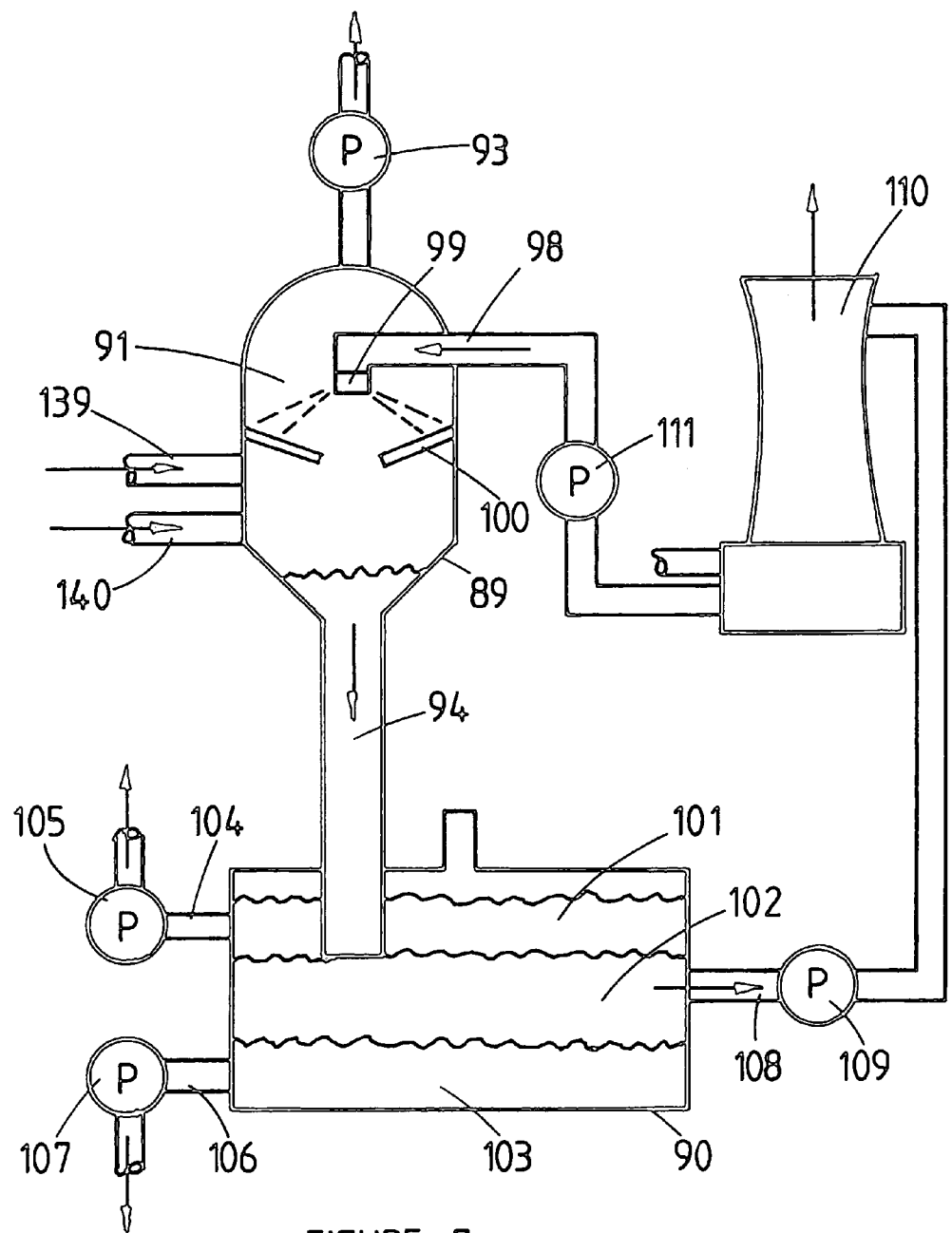

Details of a barometric condenser and condensate receiver tank are shown schematically in cross section in FIG. 7.

DESCRIPTION OF THE PREFERRED EMBODIMENTS

The cyclic coal batch devolatilization apparatus described herein is closely related to my earlier filed U.S. Patent Application entitled, Engine Fuels from Coal Volatile matter, Ser. No. 12/454,640, filed 21 May 2009 and this earlier patent application is incorporated herein by reference thereto.

In the apparatus described herein, each coal batch is placed, alone, within a devolatilization reactor chamber, and remains within this reactor chamber throughout the entire multistep devolatilization process, and several coal batches are concurrently being processed in several separate reactor chambers. A single reactor chamber is used in the apparatus described in my earlier filed U.S. patent application Ser. No. 12/454,640, with several batches of coal being concurrently processed within this single reactor chamber.

In both of these differing apparatus the coal is subjected to essentially the same devolatilization process of repeated cycles of superheated steam compression followed by steam and volatile matter decompression, release, and removal;

Each superheated steam cycle for the devolatilization process consists of a steam compression followed by a steam release. The compression steam flow from the boiler into the reactor chambers is largely a throttling process combined with a transfer of heat from steam to coal. The steam release flow from the reactor chamber into the condenser is also largely a throttling process, within the constricted flow passages of the pores and interchunk spaces, but without appreciable heat transfer.

A principal benefit of the coal devolatilization apparatus described herein, is that coke and coal batches are transferred out of, or into, reactor chambers, only when at moderate temperatures, and special seals and materials are not required for these coke and coal transfer mechanisms. The apparatus described in my earlier filed U.S. patent application Ser. No. 12/454,640, transfers coke batches at maximum temperature, out of the devolatilization reactor chamber and into the coke quench chamber, and special and expensive seals and materials are required for this transfer mechanism. On the other hand the coal devolatilization apparatus described herein makes use of several separate pressure vessel reactor chambers, which will be more expensive than the single pressure vessel and devolatilization reactor chamber used on my earlier filed U.S. patent application Ser. No. 12/454,640;

The apparatus of this invention can be used to carry out a devolatilization process for separating carbonaceous fuels containing volatile matter, such as coal or biomass, into two or more separated products, one or more volatile matter products, and a devolatilized solid coke product. Several steam cycles of compression by highly superheated steam, followed by steam release, are applied to batches of coal or biomass, contained within a pressure vessel devolatilization reactor chamber. The carbonaceous fuel is heated by direct contact with the superheated steam.

During each steam cycle the steam is first compressed at boiler pressure into the interchunk spaces between carbonaceous fuel chunks, and also into the pore spaces within each carbonaceous fuel chunk. Direct contact heat transfer takes place, from the steam, into the coal chunks, through the large interchunk and pore interior areas, and increases the temperature of the carbonaceous fuel chunks. Subsequently, during steam release at steam condenser vacuum, the steam flows out of the pore spaces and through the interchunk spaces, and direct contact throughflow heat transfer occurs. In this way, after several such steam cycles, the carbonaceous fuel can reach temperatures sufficiently high to cause rapid occurrence of the complex devolatilization process. This complex devolatilization process includes: vaporization of lower molecular weight volatile matter; melting of medium molecular weight volatile matter; thermal cracking of a wide range of molecular weight volatile matter, including otherwise solid molecules, into lower molecular weight volatile matter; and reactions between these various molecules leading to the formation of higher molecular weight molecules, some of which become solid coke. In this way, portions of the original coal or biomass become gases, other portions become liquids, other portions become tars, and some portions become coke added to the original coke portions.

During steam release the several gas volatile matter products, created by these devolatilization reactions, expand and force tars and liquids out of the carbonaceous fuel chunks to mix into the steam, and leave the devolatilization reactor chamber with the departing steam, leaving a devolatilized solid coke product behind in the devolatilization reactor chamber.

One of the principal beneficial objects of this invention is to increase the rate of heat transfer from steam to coal, by use of cyclic compression of steam into coal pore spaces and interchunk spaces, followed by release of steam and volatile matter out of these spaces. Additionally, heat is transferred almost uniformly into each coal chunk, with reduced thermal expansion stresses, and a resulting mechanically stronger coke. In this way volatile matter portions of coal and biomass can be rapidly separated into several volatile matter fuel products and a solid coke fuel product. During steam release the steam, together with these separated volatile matter portions, leaves the devolatilization reactor chamber, and the solid coke remains within the devolatilization chamber.

The volatile matter leaving the devolatilization reactor chamber can be separated from the steam, and further separated into three separate volatile matter fuels; a gas volatile matter fuel; a liquid volatile matter fuel, and a tar volatile matter fuel.

Tars can be separated from the steam, the gas volatile matter, and the condensable volatile matter in a tar centrifuge. A steam condenser can be used to separate gas volatile matter from steam condensate and condensable volatile matter. Flotation separation in a condensate receiver tank can separate steam condensate from condensable volatile matter.

Figure 1:
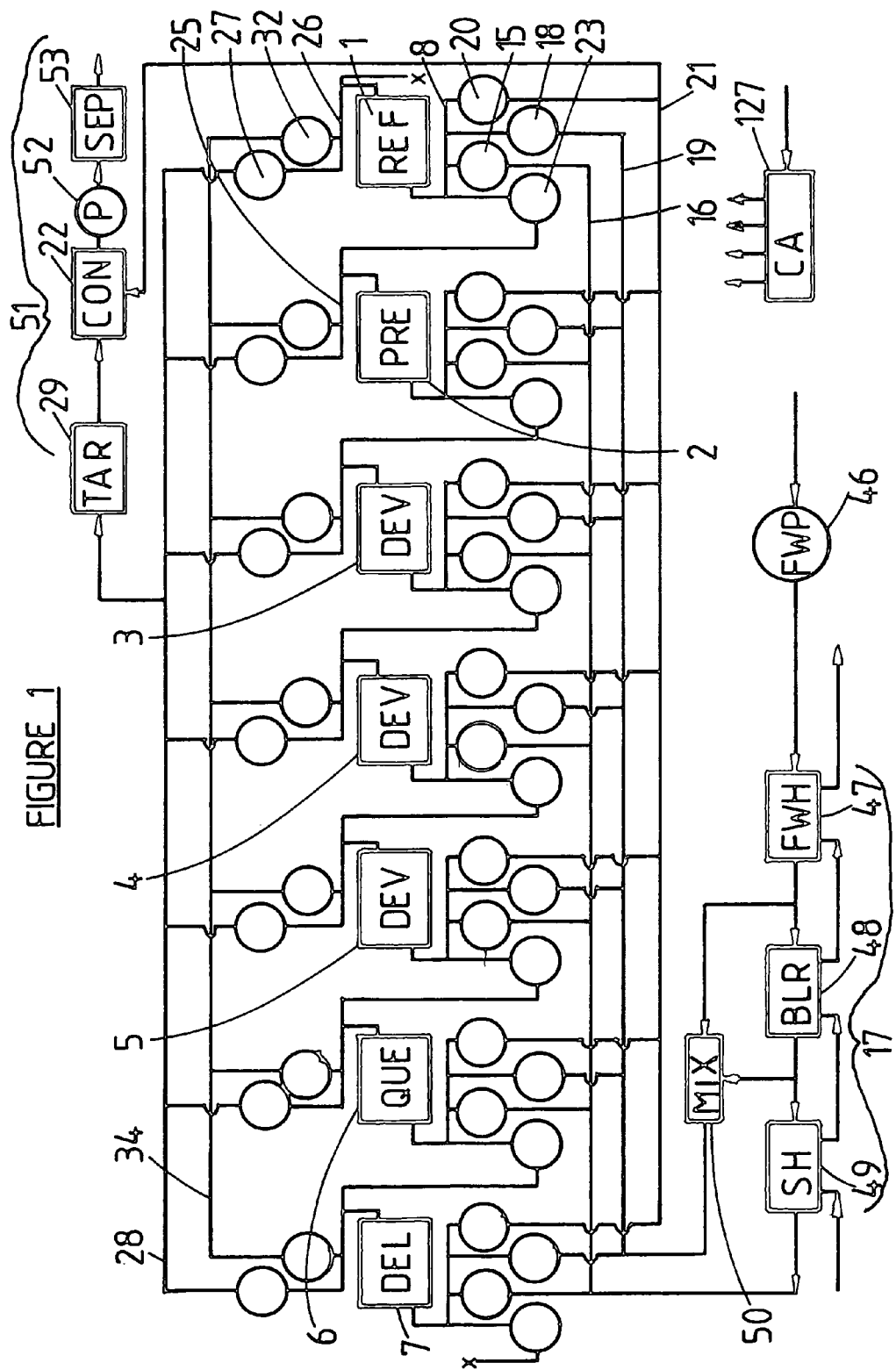

The FIG. 1 Form of the Invention

One particular example form of this invention is illustrated schematically in FIG. 1, and comprises the following elements:

A. Seven separate pressure vessel chambers, 1, 2, 3, 4, 5, 6, 7, are used on this FIG. 1 system. Each reactor chamber is equipped with a refill port and a refill port seal for opening and sealably closing the refill port through which each coal batch is refilled into the reactor chamber. Each reactor chamber is equipped with a delivery port and a delivery port seal for opening and sealably closing the delivery port through which each devolatilized coke batch is removed from the reactor chamber. Details of these reactor chambers are shown on FIG. 3 and described hereinbelow. Each reactor chamber is filled with four valves connected to the reactor inlet manifold, as follows for reactor chamber, 1, and intake manifold, 8:
  1) A superheated steam valve, 15, connects intake manifold, 8, to superheated steam manifold, 16, which is supplied with superheated steam from the steam boiler unit, 17;
  2) A wet steam valve, 18, connects intake manifold, 8, to wet steam manifold, 19, which is supplied with wet steam from the steam boiler unit, 17;
  3) A quench and preheat steam valve, 20, connects intake manifold, 8, to quench and preheat steam manifold, 21, which delivers quench and preheat steam from reactor chamber, 1, to the steam condenser, 22;
  4) A superheated steam transfer valve, 23, connects intake manifold, 8, to the exit manifold, 25, of another reactor chamber, 2;

Each reactor chamber is fitted with two valves connected to the reactor exit manifold, 26, as following for reactor chamber, 1:
  5) A steam and volatile matter transfer valve, 27, connects exit manifold, 26, to the steam and volatile matter manifold, 28, which delivers steam and volatile matter into the tar centrifuge, 29;
  6) A quench steam valve, 32, connects exit manifold, 26, to quench steam transfer to preheat manifold, 34, which transfers coke quench steam from another reactor chamber, 6, undergoing cyclic coke quench by wet steam, into reactor chamber, 1, during coal preheat in reactor chamber, 1, as described hereinbelow;

B. A valve control and actuator unit, 127, is operative to open and close these several valves, and to cyclically open and close these valves, in order to carry out the devolatilization process on coal placed into the devolatilization reactor chambers. This control and actuator operation can be carried out by hand or preferably automatically. The devolatilization process is described hereinbelow.

C. The steam boiler, 17, comprises the following elements:
  1) A feedwater pump (FWP), 46, delivers boiler feedwater into a feedwater heater (FWH) 47, and heated feedwater flows into the steam boiler (BLR), 48;
  2) Saturated steam from the boiler, 48, is passed, in part, through the steam superheater (SH) 49, and superheated steam from the superheater, 49, flows into the superheated steam manifold, 16, and from there into those devolatilization reactor chambers undergoing the devolatilization process;
  3) A separate, metered portion of saturated steam from the boiler, 48, is mixed with a metered portion of heated feedwater from the feedwater heater, 47, in the mixer (MIX), 50, to create a wet steam, which flows into the wet steam manifold, 19, and from there into that reactor chamber, 6, undergoing coke quench;
  4) Fuel and air are burned in the superheater, 49, and the hot burned gases flow in turn through the superheater, 49, the boiler, 48, and the feedwater heater, 47, and the thusly cooled burned gases are discharged to atmosphere from the feedwater heater;

D. The volatile matter products removed from the coal in the devolatilization reactor chambers are recovered separately in the receiver of steam and volatile matter unit, 51, comprising the following components:
  1) A tar centrifuge (TAR), 29, centrifugally separates non volatile tars from steam and volatile tars. Details of this tar centrifuge, 29, are shown schematically in FIG. 2 and described hereinbelow;
  2) A surface condenser (CON), 22, condenses steam and condensable volatile matter, and separates these from non condensable gas volatile matter. Non condensable gas volatile matter is pumped from the shell side of the surface condenser by a vacuum pump.
  3) Steam condensate and condensable volatile matter are pumped from the condenser, 22, by the condensate pump (P), 52, into the condensate receiver tank (SEP), 53, where water insoluble volatile matter is flotation separated from steam condensate. Details of the separator tank are shown schematically on FIG. 5 and described hereinbelow;

E. This FIG. 1 apparatus operates with each batch of coal fully occupying a single reactor chamber, while passing through a sequence of process steps. During several of the process steps, several cycles of reactor chamber steam compression, followed by pressure release, are applied to the reactor chambers during each step. For example, in FIG. 1 the seven reactor chambers could be operating as follows:
  1) Reactor chamber, 1, is being refilled with a fresh batch of coal, and all valves are closed on reactor chamber, 1, with the refill port and seal open, and with the delivery port closed and sealed.
  2) Coal in reactor chamber, 2, is being preheated by quench steam released cyclically from reactor chamber, 6. The quench steam valve, and the quench and preheat steam valve, are open, and all other valves, and the refill port and delivery port seals, are closed on reactor chamber 2.
  3) Coal in reactor chambers 3, 4 and 5 is being devolatilized using the following cycle: first, superheated steam is compressed into reactor chamber, 5, via its opened superheated steam valve, and flows into reactor chamber, 4, via its open superheated steam transfer valve, and continues flowing into reactor chamber, 3, via its superheated steam transfer valve, all other valves and ports on reactor chambers, 3, 4, 5, being closed. After a compression time interval the steam, and the volatile matter removed from the coal, are next released from reactor chambers 3, 4, 5 by closing reactor chamber, 5, superheated steam valve, and opening the steam and volatile matter transfer valve, at least on reactor chamber 3, and optionally on reactor chambers 4 and 5, and with the superheated steam transfer valves of reactor chambers 3, 4, remaining open, with all other valves and ports on reactor chambers 3, 4, 5 being closed. This steam compression and release cycle is repeated several times during each devolatilization process step. Several different release patterns can be used, depending on which of the three steam and volatile matter transfer valves are opened during release; Best superheated steam energy efficiency results if only the steam and volatile matter transfer valve of reactor chamber, 3, is opened, so that the released steam passes out through all three reactor chambers; Redeposition of tars is minimized if all three steam and volatile matter transfer valves are opened during all or part of each release. The steam and volatile matter thus released from reactor chambers 3, 4, 5, passes into the receiver of steam and volatile matter unit, 51, via the steam and volatile matter manifold, 28.

4) The now devolatilized solid coke in reactor chamber, 6, is being quenched from essentially superheated steam temperature down to saturated steam temperature by cyclically compressing the coke with wet steam: wet steam is first compressed into reactor chamber, 6, via its now open wet steam valve with all other ports and valves of reactor chamber, 6, closed, and after a compression time interval, the now reheated quench steam is released by opening the quench steam valve of reactor chamber, 6, with the wet steam valve thereof now closed, and this wet steam compression and release cycle is repeated several times during each devolatilization process step;

Each wet steam cycle for the coke quench process consists of a steam compression followed by a steam release. The compression steam flow from the mixer into the quench chamber is largely a throttling process combined with a transfer of heat from coke to steam. The steam release flow from the quench chamber is also largely a throttling process but without appreciable heat transfer.

A converging, or converging-diverging, nozzle, in the quench steam discharge pipe from the quench chamber, could be used to increase the cooling effect of the wet steam by transferring a portion of the throttling transfer of flow energy back into steam internal energy to the connected coal preheat chamber, where an improved coal preheat would result.

5) The devolatilized and quenched coke is discharged into a coke receiver from reactor chamber, 7, with all valves thereof closed and with the delivery port and refill port open.

6) Each reactor chamber passes through the complete set of process steps in sequence, and after coke removal, begins the next sequence by being refilled with fresh coal to start the next sequence.

As described above, and as shown on FIG. 1, the seven coal batches, in the seven devolatilization reactor chambers, are carrying out the following devolatilization process steps in the following sequence:

7) Reactor chamber, 1 (REF). is being refueled with a fresh batch of coal;

8) The coal batch in reaction chamber, 2 (PRE), is being preheated by throughflow of quench steam, essentially up to steam saturation temperature at boiler pressure, in order to avoid steam condensation in the devolatilization process;

9) The three coal batches in reaction chambers 3, 4, 5 (DEV), are being heated up to temperatures where coal volatile matter separates from the solid coke, and is removed from the coke and the reaction chambers during each pressure release time interval of each cycle of steam compression and release; the removed steam and coal volatile matter are delivered into the receiver of steam and volatile matter recovery unit, 51; the coal is heated progressively in reactor chambers 3, 4, 5, reaching essentially steam superheat temperature in the final reactor chamber, 5;

10) The devolatilized coke is cooled down to steam boiler saturation temperature in reactor chamber 6 (QUE), by wet steam cyclically compressed thereinto, and then released therefrom to flow through the preheat reaction chamber, 2;

11) The devolatilized and quenched coke is removed from reactor chamber 7 (DEL), and delivered into a coke receiver. Gravity removal can be used with non swelling coals, but forced coke removal may be necessary for free swelling coals;

12) In this FIG. 1 form of the invention, three separate devolatilization reactor chambers, 3, 4, 5, are connected together and operate in series. More than three devolatilization reactor chambers in series can be used but at least one devolatilization reactor chamber is required on all forms of this invention. The energy efficiency of superheated steam utilization is improved as the number of devolatilization reactor chambers operated in series is increased.

Various types of control and actuator unit, 127, can be used where automatic control and actuation are to be used. A mechanical, motor driven, set of cams can control directly, or remotely via pilot valves, the opening and closing of the various valves, and port seals, and coke removal, and coal refill mechanisms. Electrical or electronic control with solenoid or piezoelectric actuators can be used in whole or in combination with mechanical control and actuator systems.

The Devolatilization Reactor Chamber

An example of a single devolatilization reactor chamber is illustrated schematically in FIG. 3, together with example refill and delivery port seals at reactor inlet port and delivery port. An example driver means for driving these port seals is shown schematically in FIG. 4.

The reactor chamber, 112, of circular cross section, is enclosed inside a pressure vessel container, 113, fitted with a high temperature ceramic inner liner, 114. The reactor intake manifold, 115, connects to a reactor inlet distributor, 116, with several inlet ports, 117, distributed peripherally around the reactor inner circumference. The reactor exit manifold, 118, connects to a reactor outlet collector, 119, with several outlet ports, 120, distributed peripherally around the reactor inner circumference.

The reactor chamber, 112, is refilled with coal chunks, at the start of each sequence of process steps, via the top refill port, 121, and through the refill port sliding seal plate, 122, shown open on FIG. 3. The refill port is sealed by the "U" shaped seal ring, 123, when the seal plate 122, is moved to cover the refill port, 121.

The reactor chamber, 112, is emptied of devolatilized coke chunks, at the end of each sequence of process steps, via the bottom delivery port, 124, and through the delivery port sliding seal plate, 125, shown open in FIG. 3. The delivery port is sealed by the "U" shaped seal ring, 126, when the seal plate, 125, is moved to cover the delivery port, 124.

Metallic "U" ring seals are shown on FIG. 3, but other types of high temperature metallic seal rings can be used, such as "O" rings, or "C" rings, with or without internal seal loading springs.

The reactor chamber shown in FIG. 3, is tapered, with chamber cross section area increasing from the refill port, 121, toward the delivery port, 124. This taper will be preferred if free swelling coals are to be processed, in order to minimize the tendency of such free swelling coals to clog up and bind inside the chamber during devolatilization.

These sliding seal plates can be thusly moved to open or close the refill and delivery ports, via the piston rod, 65, of the piston and cylinder driver shown schematically in FIG. 4. The driver piston, 60, can be driven or retracted by applying hydraulic or pneumatic fluid pressure, or vent, to the actuator piston, 60, via the pressure and vent valves, 66.

Coal and Coke Transfer Mechanisms

Several types of coal and coke transfer mechanisms can be used to transfer coal from a coal hopper into the reactor chambers and to deliver devolatilized coke out of the reactor chambers. Several such mechanisms are described in my earlier filed U.S. patent application Ser. No. 12/454,640, as incorporated herein by reference thereto.

An example combined coal transfer and coke removal mechanism is shown schematically in FIG. 6 and FIG. 3, as operated to deliver one coal batch, or to remove one coke batch, to and from a devolatilization reactor chamber, 112. This combined transfer mechanism comprises the following elements:

1) Coal from the coal hopper, 127, transfers by gravity into the coal recess, 128, in the moveable transfer block, 129, when the transfer block is aligned as shown in FIG. 6.
2) To transfer coal into the reactor chamber, 112, the transfer block, 129, is moved to align the coal recess, 128, with the driver piston, 130, which is always aligned with the reactor chamber, 112, top refill port, 121. Concurrently the refill port sliding seal plate, 122, is moved to also align the refill cavity, 131, with the refill port, 121. The driver piston, 130, is then driven downward to forcibly deliver coal out of the coal recess, 128, and into the reactor chamber, 112, by applying pneumatic or hydraulic pressure via the pressure and vent valves, 132. The driver piston, 130, is then fully retracted out of the coal recess, 128, and then sliding seal plate, 122, is moved to seal the refill port on the reactor chamber, 112. During this coal refill transfer the delivery port on the delivery port sliding seal plate, 125, of the reactor chamber, 112, as shown on FIG. 3, remains closed to seal the bottom delivery port, 124, of the reactor chamber, 112.
3) After each devolatilization reactor chamber, thusly refilled with a coal batch, subsequently completes the devolatilization steps, and the coke quench step of the sequence of steps, the devolatilized and quenched coke is transferred out of each devolatilization reactor chamber, 112, by moving the transfer block, 129, to align the coke transfer cylinder, 133, with the top refill port, 121. Concurrently the refill cavity, 131, on the refill sliding seal plate, 122, is aligned with the top refill port, 121, of the reactor chamber, 112. Also the delivery port on the delivery port sliding seal plate, 125, is aligned with the bottom delivery port, 124, of the reactor chamber, 112. The driver piston, 130, together with the now aligned coke transfer cylinder, 133, are then driven downward to forcibly deliver devolatilized coke product out of the reactor chamber, 112, and into a receiver of a devolatilized coke product. The driver piston, 130, is then fully retracted, and the coke transfer cylinder is also fully retracted by the reactor spring, 137. The delivery sliding seal plate, 125, is then aligned to seal the bottom delivery port, 124, of the reactor chamber, 112. The reactor chamber is now prepared for the first step of the next sequence of steps, which is to be again refilled with a fresh batch of coal, and commence the next following sequence of process steps;

Separate piston and cylinder drivers, as shown in FIG. 4, and described hereinabove, can be used for driving the moveable transfer block, 129, as well as for driving the sliding seal plates, 122 and 125, via drive bars, 134, 135, 136, respectively.

The volume of coal transferred into each reactor chamber during coal refill, is to be sufficiently less than the interior volume of the reactor chamber as to allow for swelling of the coal during devolatilization.

While gravity delivery of coal could alternatively be used, forced removal of devolatilized coke, from each reactor chamber, is preferred, if not required. During devolatilization, at elevated temperatures, coals pass through a semi plastic condition when separate coal chunks can become joined together. This plasticity in combination with the free swelling can cause the coke chunks in each coke batch to not only join together, but also become somewhat attached to the reactor chamber walls, and thus may not fall out of the reactor chamber under the influence of gravity during coke removal.

Each devolatilization reactor chamber can be fitted with a coal refill and coke removal mechanism, such as the FIG. 6 example. Alternatively, a single coal refill mechanism can be used, which is moved from one reactor to the next; being operative on only that reactor currently being refilled with coal. Similarly a single coke removal mechanism can be used, and is operative on only that reactor currently undergoing coke removal.

Tar Centrifuge and Steam Condenser

Figure 2:
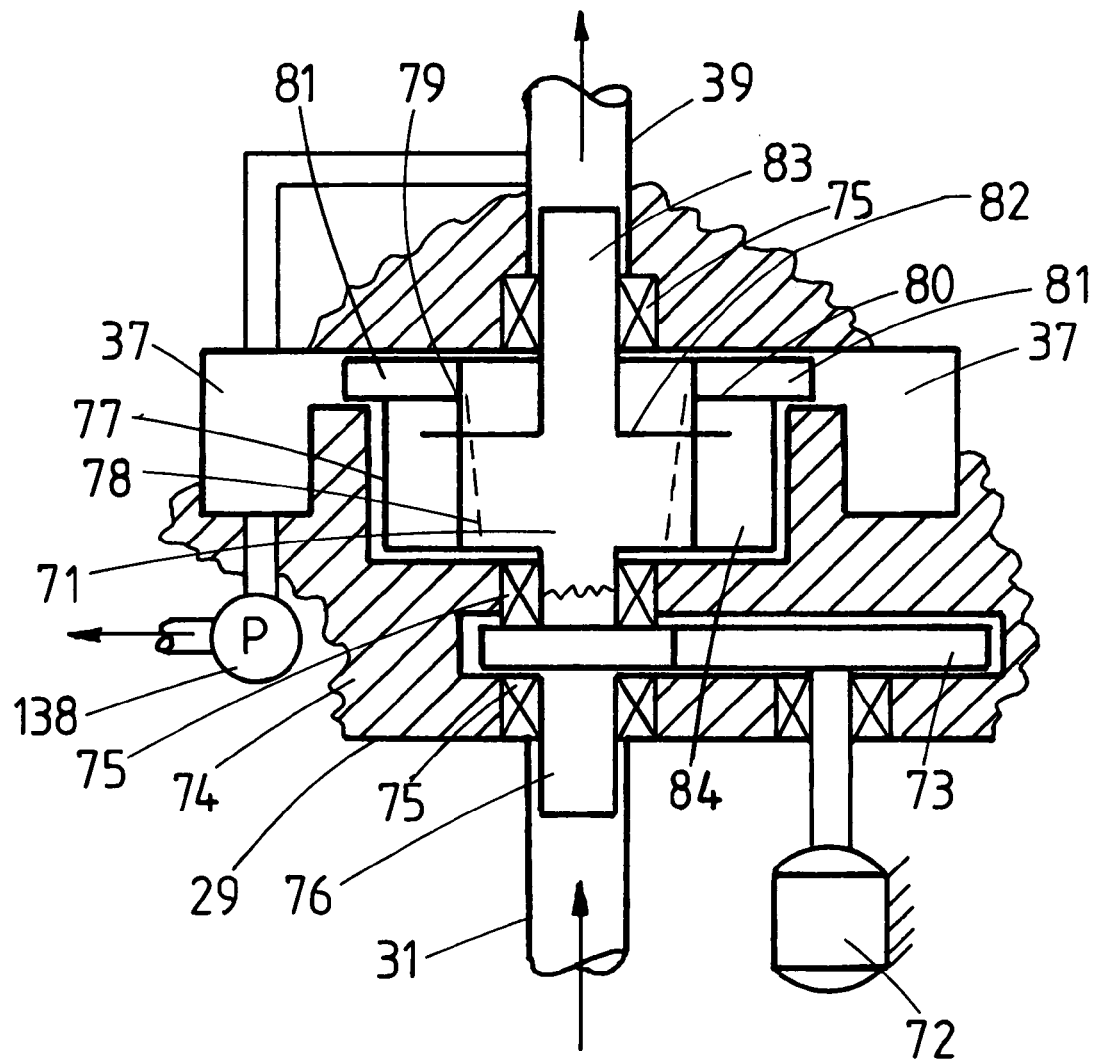

One example form of tar centrifuge, 29, is shown schematically in cross section in FIG. 2. The centrifuge bowl (71), is rotated at high speed by the drive motor (72), and gears (73), and is supported within the centrifuge enclosure (74), by the several sealed bearings (75). Steam and volatile matter from the devolatilization reactor chambers, enters the centrifuge bowl via pipe (31), from the steam and volatile matter manifold, 28, and hollow bowl lower shaft (76). Within the centrifuge bowl (71), centrifugal force pushes heavy volatile matter tars to the outer bowl radius (77), where they accumulate until this tar layer depth (78), reaches the inner radius (79), of the spill plate (80). Radial guide vanes (84), can be used to assist in bringing tar angular velocity up to bowl angular velocity. Thereafter volatile matter tars are thrown out of the centrifuge bowl (71), via the exit nozzles (81), and into the tar receiver tank, 37. The sealed and heated tar receiver tank, 37, is vented into the steam pipe, 39, connecting into the shell side, 85, of the shell and tube steam condenser, 22. Hot tar is pumped out of the tar receiver tank, 37, by the vacuum pump, 138. The mask plate (82), prevents flow of steam and remaining non tar volatile matter portions from entering the tar receiver tank, 37. Steam and non tar volatile matter leave the centrifuge bowl (71), and flow into the condenser (22), via the hollow bowl upper shaft (83), and pipe (39).

An example surface steam condenser (22), is illustrated schematically in cross section in FIG. 5. Steam and non tar volatile matter, from the tar centrifuge discharge pipe (39), flows into the shell side (85), of the shell and tube steam condenser (22). Quench and preheat steam enter the shell side, 85, of the surface condenser, 22, via the pipe, 33, from the quench and preheat steam manifold, 21. Cooling water from a cooling water source (40), flows through the steam condenser tubes (86), to cool and condense the steam and non tar volatile matter. Non condensable gas volatile matter is pumped, by the vacuum pump (42), via pipe (41), from the top of the shell side (85) of the condenser, and delivered as a gas volatile matter product. Steam condensate and condensable volatile matter collect in the condenser hot well (87), and are pumped therefrom by the condensate pump (44), into the vented condensate receiver tank (53).

In the condensate receiver tank, 53, gravity acts to float liquid volatile matter portions on top of the steam condensate. This liquid volatile matter fuel product is removed via pipe, 69, and steam condensate is removed via pipe, 70, from the condensate receiver tank, 53.

A barometric condenser and separator tank can be used as an alternative volatile matter recovery unit, 51, in place of the tar centrifuge, 29, surface condenser, 22, and condensate receiver tank, 53, described hereinabove. An example barometric condenser, 89, and flotation separator tank, 90, are shown schematically in cross section in FIG. 7.

Steam and volatile matter, discharged from the devolatilization reactor chambers during each steam release step of each steam cycle, is transferred into the steam and cooling water mixing chamber (91), of the barometric condenser (89), directly from the steam and volatile matter manifold, 28, and pipe, 139. Quench and preheat steam from the quench and preheat manifold, 21, is similarly transferred into the steam and cooling water mixing chamber, 91, via pipe, 140. Cooling water from the cooling tower, 110, flows continuously into the steam and cooling water mixing chamber (91), via spray nozzles aligned to mix cooling water with the entering steam and volatile matter, in order to condense the steam and condensable portions of the volatile matter. Non condensable gas fuel portions of the volatile matter are removed from the top of the steam and cooling water mixer chamber (91), via the vacuum pump (93). The remaining liquid and tar volatile matter portions, together with the cooling water and steam condensate, leave the bottom of the steam and cooling water mixer chamber (91), via the barometric condenser tailpipe (94), and transfer into the flotation separator tank (90).

An adequate vacuum can be created within the steam and cooling water mixer chamber (91), and hence also within the devolatilization reactor chambers during the steam release portion of each steam cycle, by using a barometric condenser tailpipe (94), of about thirty-four feet length above the fluid level in the flotation separator tank (90). Operating the devolatilization reactor chamber at such vacuum pressures, during the release portion of each steam cycle, increases the ratio of volatile matter product over solid coke product.

Within an adequately large flotation separator tank the various fluids can be sufficiently quiescent that gravity can act to separate the water insoluble volatile matter materials from the cooling water and steam condensate, as well as from each other. Volatile matter liquids of lower density than water, will float to the top of the flotation separator tank, and can be removed via the volatile matter liquids removal pipe (104) and pump (105) Volatile matter tars of greater density than water will sink to the bottom of the flotation separator tank, and can be removed via the tar removal pipe (106) and pump (107).

Cooling water and steam condensate can be pumped from the middle layer (102) via pipe (108), and pump (109). Cooling water and steam condensate can be delivered into the top of an atmospheric cooling tower (110), where evaporative cooling reduces the cooling water temperature sufficiently for reuse and recirculation through the barometric condenser (89), via pump (111), and pipe (98). Other sources of cooling water can be used such as rivers and cooling ponds.

As shown in FIG. 7, the liquid volatile matter and the tar volatile matter are separated from each other, and from the cooling water and steam condensate, by the force of gravity acting on the density differences between these fluids. Centrifuge separators can alternatively be used to carry out this separation, and apply larger separating forces.

In this way, the volatile matter, removed from each coal batch is further separated into three separate fuel products: a gas volatile matter fuel, a liquid volatile matter fuel, and a tar volatile matter fuel. The gas volatile matter fuel can be used as fuel in steam boilers, such as the steam boiler supplying steam into the devolatilization reactor chamber. Both the liquid volatile matter fuel, and the tar volatile matter fuel, can be used as fuel in piston internal combustion engines for transportation uses. This is one of the principal beneficial objects of this invention, to efficiently utilize the volatile matter portion, of our very large domestic coal resource, as fuel for our critical transportation needs.

Steam to Coal Ratio

The ratio of superheated steam mass required, per unit mass of coal to carry out the coal devolatilization process can be estimated approximately from the following relations, based on a steady flow approximation to the batch process:

$$\left(\frac{mc}{ms}\right) = \frac{(\text{coal mass per refill})}{(\text{Superheated steam mass per compression cycle})}$$

$$\left(\frac{mc}{ms}\right) = \frac{(PF)(dcarb)(vsa)(Eff)}{[(1-PF)+(PF)(0.5)(VM)](n)}$$

$$(\text{cycles}) = \frac{(mc)(1-VM)(cpc)}{(ms)(cps)} =$$

Superheated steam compression cycles per refill time interval $$\frac{\text{Steam Flow}}{\text{Coal Flow}} = \frac{(\text{cycles})}{\left(\frac{mc}{ms}\right)} = \frac{\text{Steam mass}}{\text{Coal mass}}$$

Wherein:
- (PF)=Packing factor of coal chunks in the reactor chamber, coal volume per reactor volume;
- (dcarb)=Density of solid coal;
- (vsa)=Average specific volume of steam inside reactor chamber;

$$(vsa) \cong \frac{(vsh)+(vs\ sat)}{2}$$

- (vsh)=Superheated steam specific volume;
- (vs Sat)=Saturated steam specific volume;
- (VM)=Coal volatile matter fraction;
- (n)=Number of reactor chambers in series for the devolatilization process;
- (Eff)=Overall heat exchange efficiency from steam to coal, fractional;
- (cpc)=Coal specific heat, Btu/lbsm/° F.;
- (cps)=Steam vapor specific heat, Btu/lbsm/° F.;

The ratio of wet steam mass required per unit mass of coal, to carry out the quench process on the coke product, can be estimated approximately from the following relations, based on the simplifying assumption that quench cooling of the coke results largely from evaporation of the liquid water portion of the wet steam within a single reactor chamber, (n)=1.0:

$$\left(\frac{mc}{mws}\right) = \frac{(\text{coal mass per refill})}{(\text{wet steam mass per compression cycle})}$$

$$\left(\frac{mc}{mws}\right) = \frac{(PF)(dcarb)(vsa)}{[(1-PF)+(PF)(VM)]}$$

$$\left(\frac{mck}{mc}\right) = (1-VM) = \frac{\text{Coke mass per refill}}{\text{Coal mass per refill}}$$

$$(\text{wet cycles}) = \left(\frac{mc}{mws}\right)\frac{(1-VM)(cpc)[TSH-Tsat]}{[\text{Average}(hout-hin)]}$$

$$\left(\frac{\text{Wet Steam Flow}}{\text{Coal Flow}}\right) = \left(\frac{mws}{mc}\right)(\text{Wet cycles})$$

(wet cycles)=Wet steam compression cycles per refill time interval
(TSH)=Superheated Steam Temperature, ° F.
(Tsat)=Saturated Steam Temperature, ° F.
Average $(h_{out}-h_{in})=(1-x)(hfg)+(0.5)(cps)[TSH-Tsat]$ $$(X) = \frac{(\text{Vapor steam mass})}{(\text{Vapor steam mass + liquid water mass})};$$

For wet steam;
(hfg)=Latent heat of evaporation of saturated liquid water at boiler pressure.

Industrial Uses of the Invention

The principle use of coal, mined in the United States, is in conventional steam power plants for electric power generation, where the coal is fired directly into steam boiler furnaces. These plants could realize an economic gain by first using this invention to separate the volatile matter from the coal, as a premium priced product, for use in internal combustion engines fitted for usage of slurry fuels. The devolatilized coke could then be fired directly into the steam boiler furnace, without the need for coke quenching. The cost of the required additional coal would be more than offset by the premium price obtained from sale of the separated volatile matter to engine users.

Combined cycle electric power plants currently use expensive natural gas as fuel into the gas turbine engine. Modified combined cycle electric power plants could be fueled entirely by low cost coal by use of the apparatus of this invention. The steam and volatile matter, separated from the coke in the devolatilization reactor chamber could be fired into the gas turbine cycle. The hot gas turbine exhaust, plus the devolatilized coke fuel, could be fired into the steam cycle. Unit energy costs of fuels vary but, per unit of fuel energy, natural gas is usually about five to ten times more costly than coal. The ratio of fuel energy into the gas turbine cycle, to fuel energy into the steam cycle, can be increased by blending non food farm harvest biomass with the coal, and sending this blend through this invention, in order to increase the ratio of volatile matter fuel to coke fuel. Biomass fuels typically have volatile matter content of seventy to eighty percent by weight.

A principal beneficial object of this invention is to provide a method to replace expensive petroleum distillate fuels, with fuels derived from low cost coal and non food farm harvest biomass, for use in internal combustion engines for our critical surface transportation industries. A modified diesel engine fuel system is described in the following references, which permits use of very high viscosity fuels, such as volatile matter tars, to be efficiently used in medium and small bore diesel engines:

Supplementary Slurry Fuel Atomizer and Supply System, U.S. Pat. No. 7,281,500, Firey, 2007
Common Rail Supplementary Atomizer for Piston Engines, U.S. Pat. No. 7,418,927, Firey, 2008;
Rotary Residual Fuel Slurrifier, Firey, U.S. Patent Application published on internet, US-2008-0172934-A1;
Modified Common Rail Fuel Injection System, Firey, U.S. Patent Application, to be published on internet, Jul. 30, 2009;
Rotary Tar Slurrifier, Firey, U.S. Patent Application High viscosity fuels are adequately preatomized, outside the engine, into a fuel in water slurry fuel, also containing other components, such as slurry stabilizers and ignition aids. These references are incorporated herein by reference thereto.

Fuel costs vary, but the unit energy cost of petroleum is usually about five- to tenfold greater than the unit energy cost of coal.

The fuel energy content of known U.S. coal reserves is very large, and about ten times the fuel energy content of known worldwide petroleum reserves. National energy independence, needed for a sound national defense capability, can be achieved by adopting coal fuels for efficient use in our critical surface transport industries, such as the following:

Railroad locomotive diesel engines
Tug and barge diesel engines
Open cast mine shovels, trucks and draglines
Cargo ships
Farm tractor and harvester diesel engines
Long haul highway trucks A high yield of renewable engine fuel, usable in modified diesel engines, can be obtained from non food farm harvest biomass by use of the apparatus of this invention. Farm harvest biomass typically contains seventy-to-eighty percent volatile matter by weight. These volatile matter fuel yields are appreciably greater than from current biodiesel and ethanol fuel processes, and do not use the food portion of the farm harvest.

Having thus described my invention, what I claim is:

1. A coal devolatilization apparatus for separating carbonaceous fuels, coal and biomass, into two or more separated fuel products, a devolatilized solid coke product, and one or more volatile matter products, said apparatus comprising;

a number, n, of devolatilization reactor chambers, said number, n, being at least six and preferably more than six, devolatilization reactor chambers, each chamber comprising: a pressure vessel enclosure enclosing said chamber, a refill end with refill port and refill sealing means for opening and sealably closing said refill port; and a delivery end with delivery port and delivery sealing means for opening and sealably closing said delivery port;

each of said devolatilization reactor chamber further comprising: a reactor intake manifold through which fluids can flow into or out of said reactor near said delivery end of said devolatilization reactor chamber; a reactor exit manifold through which fluids can flow into or out of said reactor near said refill end of said devolatilization reactor chamber;

a steam boiler providing a source of superheated steam, and wet steam, at a desired boiler pressure, said superheated steam being delivered into a superheated steam manifold, said wet steam being delivered into a wet steam manifold; said steam boiler comprising at least a boiler and a superheater, and a boiler feedwater pump for delivering feedwater to said boiler from a feedwater source, to create saturated steam, a portion of which is supplied to said superheater to create superheated steam, said boiler and superheater combustion chamber produces heat from fuel and air; said steam boiler further comprising a mixer means for mixing a portion of feedwater, from said feedwater pump, at a fixed ratio, into a portion of said saturated steam, to create a wet steam;

a source of coal batches;
a receiver of devolatilized coke batches;
means for refilling one fresh coal batch into each said devolatilization reactor chamber, from said source of coal, via said refill port;
means for delivering one devolatilized coke batch from each said devolatilization reactor chamber, into said receiver of devolatilized coke, via said delivery port;

a receiver of steam and coal volatile matter, comprising a quench and preheat steam manifold, and a separate steam and volatile matter manifold;

a quench steam transfer to preheat manifold;

said reactor intake manifold on each said devolatilization reactor chamber is connected to four separate valves with actuators: a superheated steam valve connecting to said superheated steam manifold; a wet steam valve connecting to said wet steam manifold; a quench and preheat steam valve connecting to said quench and preheat steam manifold; a superheated steam transfer valve connected to the reactor exit manifold of but one other devolatilization reactor chamber;

each of said reactor exit manifold on each said devolatilization reactor chamber is connected to two separate valves with actuators: a steam and volatile matter transfer valve connected to said steam and volatile matter manifold; a quench steam valve connected to said quench steam transfer to preheat manifold;

control and actuator means for opening and closing said four valves on each of said reactor intake manifold, and two valves on each said reactor exit manifold; and also for operating said means for sealing and opening said refill port and said delivery port on each devolatilization reactor chamber; for operating said means for refilling a coal batch into each said reactor chamber, and means for delivering a devolatilized coke batch out of each said reactor chamber, so that each said devolatilization reactor chamber within the apparatus operates in the sequence:

(1) a coal batch refill step;
(2) a coal batch preheat step;
(3) a number, m, of coal batch devolatilization steps, the number, m, of devolatilization steps equaling the number of devolatilization reactor chambers undergoing this step and being equal to the number, n, minus four;
(4) a devolatilized coke batch quench step;
(5) a devolatilized coke batch delivery step of removing said coke batch from said reactor chamber;
(6) said sequence is repeated when said coal devolatilization apparatus is operating, wherein a number one reactor chamber is being refilled with a fresh coal batch; the coal batch in a number two reactor chamber is being preheated; the several coal batches in the next m number of reactor chambers is being devolatilized; the devolatilized coke batch in the number m plus three reactor chamber is being quenched; the devolatilized coke batch in the $n^{th}$ reactor chamber is being removed therefrom and delivered into said receiver of devolatilized coke batches;

said means for refilling one fresh batch of coal carries out a coal batch refill step by transferring a single coal batch, from said source of coal batches, into said number one reactor chamber, whose delivery port is closed, whose refill port is open and with all valves thereon closed;

quench steam, from said quench steam transfer to preheat manifold, carries out a coal batch preheat by passing quench steam through said number two reactor chamber, whose refill port and delivery port are closed and sealed, whose quench steam valve is open, whose quench and preheat steam valve is open, and whose all other valves are closed;

the m number of coal batch devolatilization steps are carried out in m devolatilization reactor chambers, flow connected in series, with superheated steam, from said superheated steam manifold, periodically entering number m plus two reactor chamber, and flowing through all m number of reactor chambers in series and periodically leaving the number three reactor chamber to flow into said steam and volatile matter manifold; with all m refill ports and delivery ports closed and sealed; with the superheated steam transfer valves open on all reactor chambers except the number m plus two reactor chambers whose superheated steam transfer valve is closed; and with the superheated steam valve on number m plus two reactor chambers being opened and closed repeatedly, during each devolatilization step, in tandem with the opening and closing of the steam and volatile matter transfer valve on the number three reactor chamber, so that whenever said steam and volatile matter transfer valve is closed, said superheated steam valve is open, and whenever said steam and volatile matter valve is open, said superheated steam valve is closed; said opening and closing of said superheated steam valve and said steam and volatile matter transfer valve being repeated a number, Z, times, during each devolatilization step, said number, Z, being greater than one; and with all other valves on said m reactor chambers being closed;

whereby superheated steam, at boiler pressure, is delivered from said steam boiler, via said superheated steam manifold, into all of the m devolatilization reactor chambers undergoing devolatilization steps, whenever the superheated steam valve on the number m plus two devolatilization reactor chambers is open, and so that steam and volatile matter are discharged from all of these same m devolatilization reactor chambers into said receiver of steam and coal volatile matter, via said steam and volatile matter manifold, whenever at least the steam and volatile matter transfer valve on the number three devolatilization reactor chambers is open, during said repeated opening and closing of said valves occurring during each devolatilization step;

the devolatilized coke batch in the number m plus three devolatilization reactor chamber, is undergoing a coke quench step of being quenched to steam saturation temperature, by periodic flow of wet steam, from said wet steam manifold, into said reactor chamber, followed by periodic discharge of quench steam, out of said reactor chamber, and into said quench steam transfer to preheat manifold; with said delivery port and said refill port closed and sealed, with said wet steam valve repeatedly opened and closed in tandem with the opening and closing of said quench steam valve, so that when said wet steam valve is open said quench steam valve is closed, and so that when said quench steam valve is open said wet steam valve is closed; said opening and closing of said wet steam valve and said quench steam valve being repeated a number, y, times during each quench step, said number, y, being greater than one; and with all other valves on said m plus three reactor chamber being closed;

the devolatilized and quenched coke in the number, n, devolatilization reactor chamber is removed by a coke delivery step from said reactor chamber, by said means for delivering one coke batch, and transferred into said receiver of devolitilized coke batches, with all valves on this reactor chamber closed, and with the delivery port and the refill port open;

whereby volatile matter is removed from each said batch of coal in turn, and delivered, together with steam, into said receiver of steam and coal volatile matter, and the devolatilized coke is separately delivered into said receiver of devolatilized coke batches.

2. A coal devolatilization apparatus for separating carbonaceous fuels, coal and biomass into two or more separated fuel products, as described in claim 1, wherein said receiver of steam and coal volatile matter comprises a tar centrifuge, and a surface condenser, and condensate receiver tank, means for further separating said volatile matter from steam, and for separating said volatile matter into two or more separated fuel products, said tar centrifuge and surface condenser, and condensate receiver tank means comprising:

a tar centrifuge means for receiving steam and volatile matter, discharged from said devolatilization reactor chambers during devolatilization steps, via said steam and volatile matter manifold, and for removing high density tars from said steam and volatile matter, by application of centrifugal force to said steam and volatile matter, and for delivering the remaining steam and non-condensable volatile matter and condensable volatile matter into said surface condenser;

said tar centrifuge means comprising a rotating bowl, rotated at high speed, by a centrifuge drive motor, within a stationary tar collector bowl, so that, high density tar portions, of steam and volatile matter flowing into said rotating bowl, are separated from steam and remaining volatile matter by centrifugal force, and are thrown into said tar collector bowl; and so that steam and remaining volatile matter flow out of said rotating bowl and into said surface condenser;

a source of cooling water;

said surface condenser means for receiving steam, and non condensable volatile matter, and condensable volatile matter, from said tar centrifuge means, into the shell side of said surface condenser, condenses said steam and condensable volatile matter by passing cooling water, from said cooling water source, into the tube side of said surface condenser, and further comprises a condensate pump for pumping said condensed steam and condensable volatile matter into said condensate receiver tank; and further comprises a vacuum pump for separately removing non-condensable volatile matter from the shell side of said surface condenser;

said condensate receiver tank is a means for separating steam condensate from condensed condensable volatile matter by flotation separation of low density condensable volatile matter on the surface of higher density steam condensate, said condensate receiver tank is vented to atmosphere;

whereby the volatile matter, separated from the coke in those devolatilization reactor chambers undergoing the devolatilization steps, is further separated into a tar volatile matter product, a non condensable gas volatile matter product, and a condensable volatile matter product.

3. A coal devolatilization apparatus for separating carbonaceous fuels, coal and biomass, into two or more separated fuel products, as described in claim 1, wherein said receiver of steam and coal volatile matter comprises, a barometric condenser, and a condensate receiver tank, means for further separating said volatile matter from steam, and for separating said volatile matter into two or more separated fuel products, said barometric condenser and condensate receiver tank means comprising;

a source of condenser cooling water;

a barometric condenser means for receiving steam and volatile matter, discharged from said devolatilization reactor chamber, during devolatilization steps, via said steam and volatile matter manifold, and for collecting tars, and for condensing steam and condensable volatile matter, by directly mixing cooling water from said source with said steam and volatile matter, and comprising a vacuum pump for separately removing non-condensable volatile matter, and further comprising a barometric condenser tailpipe for delivering steam condensate, condenser cooling water, tar volatile matter, and condensable volatile matter into a condensate receiver tank at atmospheric pressure, said barometric condenser tailpipe being of sufficient vertical length to create a vacuum in said barometric condenser, a condensate receiver tank for separating condenser cooling water and steam condensate from tar volatile matter and condensable volatile matter and for separating tar volatile matter and condensable volatile matter from each other, by flotation separation of high density tar volatile matter from medium density cooling water and steam condensate, and by flotation separation of low density, non water soluble condensable volatile matter from medium density cooling water and steam condensate;

whereby the volatile matter, separated from the coke in those devolatilization reactor chambers undergoing the devolatilization steps, is further separated into a tar volatile matter product, a non-condensable gas volatile matter product, and a condensable volatile matter product.

4. A coal devolatilization apparatus for separating carbonaceous fuels, coal and biomass into two or more separated fuel products, a devolatilized solid coke product, and one or more volatile matter products, said apparatus comprising:

five devolatilization reactor chambers, comprising: a pressure vessel enclosure enclosing said chamber, and comprising; a refill end with refill port end refill sealing means for opening and sealably closing said refill port; a delivery end with delivery port and delivery sealing means for opening and sealably closing said delivery port;

each of said devolatilization reactor chamber further comprising: a reactor intake manifold through which fluids can flow into or out of said reactor near said delivery end of said devolatilization reactor chamber; a reactor exit manifold through which fluids can flow into or out of said reactor near said refill end of said devolatilization reactor chamber;

a steam boiler providing a source of superheated steam, and wet steam, at a desired boiler pressure, said superheated steam being delivered into a superheated steam manifold, said wet steam being delivered into a wet steam manifold; said steam boiler comprising at least a boiler and a superheater, and a boiler feedwater pump for delivering feedwater to said boiler, from a feedwater source, to create saturated steam, a portion of which is supplied to said superheater to create superheated steam, said boiler and superheater combustion chamber produces heat from fuel and air; said steam boiler further comprising a mixer means for mixing a portion of feedwater, from said feedwater pump, at a fixed ratio, into a portion of said saturated steam, to create a wet steam;

a receiver of devolatilized coke batches;

a receiver of steam and coal volatile matter, comprising a quench and preheat steam manifold, and a separate steam and volatile matter manifold;

a quench steam transfer to preheat manifold;

said reactor intake manifold on each said devolatilization reactor chamber is connected to three separate valves with actuators, a superheated steam valve connecting to said superheated steam manifold, a wet steam valve connecting to said wet steam manifold, a quench and preheat steam valve connecting to said quench and preheat steam manifold;

each of said reactor exit manifold on each said devolatilization reactor chamber is connected to two separate valves with actuators: a steam and volatile matter transfer valve connected to said steam and volatile matter manifold; a quench steam valve connected to said quench steam transfer to preheat manifold;

a source of coal batches;

means for refilling one fresh coal batch into each said devolatilization reactor chamber, from said source of coal, via said refill port;

means for delivering one devolatilized coke batch from each said devolatilization reactor chamber, into said receiver of devolatilized coke, via said delivery port;

control and actuator means for opening and closing said three valves on each of said reactor intake manifold, and two valves on each said reactor exit manifold; and also for operating said means for sealing and opening said refill port and said delivery port on each devolatilization reactor chamber; for operating said means for refilling a coal batch into each said reactor chamber, and means for delivering a devolatilized coke batch out of each said reactor chamber; so that each said devolatilization reactor chamber within the apparatus operates in the sequence:

(1) a coal batch refill step;
(2) a coal batch preheat step;
(3) a coal batch devolatilization step;
(4) a devolatilized coke batch quench step;
(5) a devolatilized coke batch delivery step of removing said coke batch from said reactor chamber;
(6) said sequence is repeated when said coal devolatilization apparatus is operating, wherein a number one reactor chamber is being refilled with a fresh coal batch; the coal batch in a number two reactor chamber is being preheated; the coal batch in a number three reactor chamber is being devolatilized; the devolatilized coke batch in a number four reactor chamber is being quenched; the devolatilized coke batch in a number five reactor chamber is being removed therefrom and delivered into said receiver of devolatilized coke batches;

said means for refilling one fresh batch of coal carries out a coal batch refill step by transferring a single coal batch, from said source of coal batches, into said number one reactor chamber, whose delivery port is closed, whose refill port is open and with all valves thereon closed;

quench steam, from said quench steam transfer to preheat manifold, carries out a coal batch preheat by passing quench steam through said number two reactor chamber, whose refill port and delivery port are closed and sealed, whose quench steam valve is open, whose quench and preheat steam valve is open, and whose all other valves are closed;

the coal batch in the third reactor carries out a coal devolatilization step, wherein: said delivery port and said refill port are closed and sealed; said superheated steam valve is opened and closed repeatedly in tandem with said steam and volatile matter transfer valve, so that said superheated steam valve is open when said steam and volatile matter transfer valve is closed, and so that said superheated steam valve is closed when said steam and volatile matter transfer valve is open; said opening and closing of said superheated steam valve and said steam and volatile matter valve being repeated a number, Z, times during each devolatilization step, said number, Z, being greater than one; and with all other valves on said number three reactor chamber being closed;

whereby superheated steam, at boiler pressure, is delivered from said steam boiler, via said superheated steam manifold, into this third coal batch and reactor chamber whenever said superheated steam valve is open; and steam and volatile matter are discharged from this coal batch and reactor chamber into said receiver of steam and coal volatile matter, via said steam and volatile matter manifold, whenever said steam and volatile matter transfer valve is open, during said repeated opening and closing of these valves during said devolatilization step;

the devolatilized coke in the fourth reactor chamber is undergoing a coke quench step of being quenched to steam saturation temperature by periodic flow of wet steam, from said wet steam manifold, into said reactor chamber, followed by periodic discharge of quench steam, out of said reactor chamber and into said quench steam transfer to preheat manifold; with said delivery port and said refill port closed and sealed; with said wet steam valve repeatedly opened and closed in tandem with the opening and closing of said quench steam valve, so that when said wet steam valve is open said quench steam valve is closed, and so that when said quench steam valve is open said wet steam valve is closed; said opening and closing of said wet steam valve and said quench steam valve being repeated a number, y, times during each quench step; said number, y, being greater than one; and with all other valves on said fourth reactor chamber being closed;

the devolatilized and quenched coke in the number five devolatilization reactor chamber is removed by a coke delivery step from said reactor chamber, by said means for delivering one coke batch, and transferred into said receiver of devolatilized coke batches, with all valves closed and with the delivery port and the refill port open;

whereby volatile matter is removed from each said batch of coal in turn, and delivered, together with steam, into said receiver of steam and coal volatile matter, and the devolatilized coke is separately delivered into said receiver of devolatilized coke batches.

5. A coal devolatilization apparatus for separating carbonaceous fuels, coal and biomass, into two or more separated fuel products, as described in claim 4, wherein said receiver of steam and coal volatile matter comprises a tar centrifuge, and a surface condenser, and condensate receiver tank, means for further separating said volatile matter from steam, and for separating said volatile matter into two or more separated fuel products, said tar centrifuge and surface condenser, and condensate receiver tank means comprising:

a tar centrifuge means for receiving steam and volatile matter, discharged from said devolatilization reactor chambers during devolatilization steps, via said steam and volatile matter manifold, and for removing high density tars from said steam and volatile matter, by application of centrifugal force to said steam and volatile matter, and for delivering the remaining steam and non-condensable volatile matter and condensable volatile matter into said surface condenser;

said tar centrifuge means comprising a rotating bowl, rotated at high speed, by a centrifuge drive motor, within a stationary tar collector bowl, so that, high density tar portions, of steam and volatile matter flowing into said rotating bowl, are separated from steam and remaining volatile matter by centrifugal force, and are thrown into said tar collector bowl; and so that steam and remaining volatile matter flow out of said rotating bowl and into said surface condenser;

a source of cooling water;

said surface condenser means for receiving steam, and non-condensable volatile matter, and condensable volatile matter, from said tar centrifuge means, into the shell side of said surface condenser, condenses said steam and condensable volatile matter by passing cooling water, from said cooling water source, into the tube side of said surface condenser, and further comprises a condensate pump for pumping said condensed steam and condensable volatile matter into said condensate receiver tank; and further comprises a vacuum pump for separately removing non-condensable volatile matter from the shell side of said surface condenser;

said condensate receiver tank is a means for separating steam condensate from condensed condensable volatile matter by flotation separation of low density condensable volatile matter on the surface of higher density steam condensate, said condensate receiver tank is vented to atmosphere;

whereby this volatile matter, separated from the coke in those devolatilization reactor chambers undergoing the devolatilization steps, is further separated into a tar volatile matter product, a non-condensable gas volatile matter product, and a condensable volatile matter product.

6. A coal devolatilization apparatus for separating carbonaceous fuels, coal and biomass into two or more separated fuel products, as described in claim 4, wherein said receiver of steam and coal volatile matter comprises, a barometric condenser, and a condensate receiver tank, means for further separating said volatile matter from steam, and for separating said volatile matter into two or more separated fuel products, said barometric condenser and condensate receiver tank means comprising;

a source of condenser cooling water;

a barometric condenser means for receiving steam and volatile matter, discharged from said devolatilization reactor chamber, during devolatilization steps, via said steam and volatile matter manifold, and for collecting tars, and for condensing steam and condensable volatile matter, by directly mixing cooling water from said source with said steam and volatile matter, and comprising a vacuum pump for separately removing non-condensable volatile matter, and further comprising a barometric condenser tailpipe of sufficient vertical length for delivering steam condensate, condenser cooling water, tar volatile matter, and condensable volatile matter into a condensate receiver tank at atmospheric pressure, said barometric condenser tailpipe being of sufficient vertical length to create a vacuum in said barometric condenser;

a condensate receiver tank for separating condenser cooling water and steam condensate from tar volatile matter and condensable volatile matter, and for separating tar volatile matter and condensable volatile matter from each other, by flotation separation of high density tar volatile matter from medium density cooling water and steam condensate, and by flotation separation of low density, non-water soluble condensable volatile matter from medium density cooling water and steam condensate;

whereby the volatile matter, separated from the coke in those devolatilization reactor chambers undergoing the devolatilization steps, is further separated into a tar volatile matter product, a non-condensable gas volatile matter product, and a condensable volatile matter product.

* * * * *